US012309304B2

(12) United States Patent
Johar

(10) Patent No.: US 12,309,304 B2
(45) Date of Patent: May 20, 2025

(54) SYSTEMS AND METHODS FOR FACILITATING CRYPTOGRAPHICALLY BACKED COORDINATION OF COMPLEX COMPUTER COMMUNICATIONS

(71) Applicant: Capital One Services, LLC, McLean, VA (US)

(72) Inventor: Imren Johar, Clifton, VA (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 17/937,951

(22) Filed: Oct. 4, 2022

(65) Prior Publication Data
US 2024/0113901 A1 Apr. 4, 2024

(51) Int. Cl.
*H04L 29/06* (2006.01)
*H04L 9/00* (2022.01)
*H04L 9/08* (2006.01)

(52) U.S. Cl.
CPC .............. *H04L 9/50* (2022.05); *H04L 9/0894* (2013.01)

(58) Field of Classification Search
CPC ............................... H04L 9/0894; H04L 9/50
See application file for complete search history.

(56) References Cited

U.S. PATENT DOCUMENTS

| | | | |
|---|---|---|---|
| 2021/0357927 A1* | 11/2021 | Kita | G06Q 20/38215 |
| 2023/0198785 A1* | 6/2023 | Henning | G06Q 20/3255 380/28 |
| 2023/0318856 A1* | 10/2023 | Seki | G06Q 20/3678 713/189 |
| 2023/0360030 A1* | 11/2023 | Dragan | G06Q 40/12 |
| 2024/0289179 A1* | 8/2024 | Chen | H04L 9/32 |
| 2024/0289774 A1* | 8/2024 | Cong | G06F 16/27 |

* cited by examiner

*Primary Examiner* — Rodman Alexander Mahmoudi
(74) *Attorney, Agent, or Firm* — Foley & Lardner LLP

(57) ABSTRACT

Methods and systems for uses and/or improvements to blockchain technology. In particular, the methods and systems described herein implement a novel cryptographic resource standard that provides functionality for complex communications. The novel cryptographic resource standard allows for blockchain functions that may involve single cryptographic resource transfers or batch cryptographic resource transfers as well as on-chain batching of one or more cryptographic resources.

20 Claims, 6 Drawing Sheets

150 function safeDesignatedBatchTransferFrom(address _from, address _to, uint256 [ ] _ids, uint256 [ ] _values, bytes calldata _data, designation _orig, designation _new) external;

- 152 → 160
- 154 → 162
- 156 → 164
- 158 → 166

170

/**
  @notice Transfers `_values` amount(s) of `_ids` from the `_from` address to the `_to` address specified (with safety call).
  @dev Caller must be approved to manage the tokens being transferred out of the `_from` account.

MUST revert if `_to` is the zero address.
  MUST revert if length of `_ids` is not the same as length of `_values`.
  MUST revert if any of the balance(s) of the holder(s) for token(s) in `_ids` is lower than the respective amount(s) in `_values` sent to the recipient.
  MUST revert on any other error.
  MUST emit `TransferDesignatedSingle` or `TransferDesignatedBatch` event(s) such that all the balance changes are reflected. Balance changes and events MUST follow the ordering of the arrays (_ids[0]/_values[0] before _ids[1]/_values[1], etc). After the above conditions for the transfer(s) in the batch are met, this function MUST check if `_to` is a smart contract (e.g. code size > 0). If so, it MUST call the relevant `ERC1155TokenReceiver` hook(s) on `_to` and act appropriately.

172

@param _from  Source address
  @param _to  Target address
  @param _ids  IDs of each token type (order and length must match _values array)
  @param _values Transfer amounts per token type (order and length must match _ids array)
  @param _data  Additional data with no specified format, MUST be sent unaltered in call to the `ERC1155TokenReceiver` hook(s) on `_to`
  @param _orig  Original batch designation
  @param _new  New batch designation
*/

FIG. 1B

SYSTEMS AND METHODS FOR FACILITATING CRYPTOGRAPHICALLY BACKED COORDINATION OF COMPLEX COMPUTER COMMUNICATIONS

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (in either an authorized or an unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.), combine to provide a decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology, such as a public ledger, use of digital wallets, and immutable transactions, may be seen negatively by users that wish to maintain privacy of transactions, wish to know the true identities of users involved in transactions, and wish to reverse unauthorized transactions, respectively. These technical problems present an inherent challenge with attempting to use a blockchain technology-based solution in complex operations and practical applications.

SUMMARY

Methods and systems are described herein for novel uses and/or improvements to blockchain technology. As one example, methods and systems are described herein for cryptographically backed coordination of complex computer communications. In particular, the methods and systems described herein implement a novel cryptographic resource standard that provides functionality for complex communications. The novel cryptographic resource standard allows for blockchain functions that may involve single cryptographic resource transfers or batch cryptographic resource transfers as well as on-chain batching of one or more cryptographic resources.

As described above, the nature of blockchain technology presents fundamental technical challenges with attempting to use a blockchain technology-based solution in complex operations and practical applications. First, while blockchain functions are fundamentally immutable, such immutability is not practical for all applications, such as in cases where a cryptographic resource needs to be automatically returned if erroneously transferred to an incorrect address. Second, in most blockchain protocols, each blockchain function requires a digital contribution (e.g., gas) to the blockchain network to facilitate a transfer. That is, transfer of several cryptographic resources—even between the same entities—requires respective digital contributions for each cryptographic resource being exchanged. Such a requirement makes a blockchain technology-based solution for conventional computer networking situations (which may involve millions of individual transfers) ineffective. Third, cryptographic resource standards like ERC-20 and ERC-721 require a separate self-executing program (e.g., a smart contract) to be deployed for each cryptographic resource type or collection. That is, cryptographic resources in these standards cannot be wrapped into the same smart contract. As a result, the blockchain network is saturated with excess (and redundant) bytecode on the blockchain, which creates network congestion and limits.

In view of these technical challenges, one solution is to create new cryptographic resource standards to address the aforementioned issues. However, creating new cryptographic resource standards creates yet another technical challenge in that there will inherently be limited cryptography-based digital repository (e.g., digital wallet) support for these new cryptographic resource standards. Accordingly, methods and systems are described for cryptographically backed coordination of complex computer communication using a novel cryptographic resource standard that addresses the technical challenges and also is compliant with current mainstream blockchain protocols (e.g., to ensure robust digital wallet support).

A key component of this novel cryptographic resource standard is the inclusion of attributes that enable novel functionality (e.g., an originating batch designation and a receiving batch designation). That is, the novel cryptographic resource standard includes individual cryptographic resource batch identifiers that represent a new configurable cryptographic resource type, which may have its own metadata, supply, and/or other attributes. Through the use of the batch designations, the cryptographic resource standard enables operations tailored to a single cryptograph resource or a batch and/or semi-batch of cryptographic resources by allowing self-executing programs (e.g., smart contracts) to designate particular batches of cryptographic resources as well as categorize existing cryptographic resources into new tranches or batches (e.g., re-batch existing cryptographic resources). The designation of the cryptographic resources into the batch allows for future blockchain functions to batch these cryptographic resources together (e.g., in terms of ownership, single self-executing program execution, and/or interrelated operational dependencies between the cryptographic resources). Furthermore, this information is stored on-chain in order to take advantage of the decentralized nature of blockchain records. By doing so, the system may approve a transfer of a particular batch of cryptographic resources, without approving transfers of other cryptographic resources in a shared repository and/or collection, and without including the other cryptographic resources in the transfer.

As an extension of this functionality, the novel cryptographic resource standard enables self-executing programs to perform functions related to designated batches of cryptographic resources irrespective of whether the cryptographic resources are fungible or non-fungible and irrespective of a current cryptographic storage application (e.g., digital wallet) at which a cryptographic resource is currently linked. By doing so, self-executing programs may expand the functionality gained through communication with off-chain oracles to include downstream on-chain triggering events.

In some aspects, systems and methods are described for performing blockchain functions on designated batches of available cryptographic resources irrespective of whether the available cryptographic resources are fungible or non-fungible and irrespective of current cryptographic storage application associations of the available cryptographic resources. The system may receive, at a first self-executing program that is accessible to a first blockchain node within a blockchain network, a first communication from a network oracle, wherein the first communication includes first off-chain data. The system may determine, based on the first off-chain data, a first blockchain function to perform, by the first self-executing program, on a first cryptographic resource batch having a first batch designation. The system may compare, by the first self-executing program, a current batch designation of a first cryptographic resource to the first batch designation to determine whether the first cryptographic resource corresponds to the first cryptographic resource batch. The system may, in response to determining that the first cryptographic resource corresponds to the first cryptographic resource batch, execute the first blockchain function on the first cryptographic resource.

In some aspects, systems and methods are described for facilitating cryptographically backed coordination of complex computer communications by using cryptographic resource standards that provide designations for batching. The system may receive a first request to perform a first blockchain function for a first cryptographic resource. The system may, in response to the first request, generate a first query for a first batch designation and a second batch designation, wherein the first batch designation comprises a first originating batch designation, and wherein the second batch designation comprises a first receiving batch designation. The system may receive a first user input providing the first batch designation. The system may receive a second user input providing the second batch designation. The system may, in response to receiving both the first user input and the second user input, generate a first function for the first blockchain function. The system may execute the first blockchain function.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1B shows an illustrative function and pseudocode for facilitating cryptographically backed coordination of complex computer communications, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
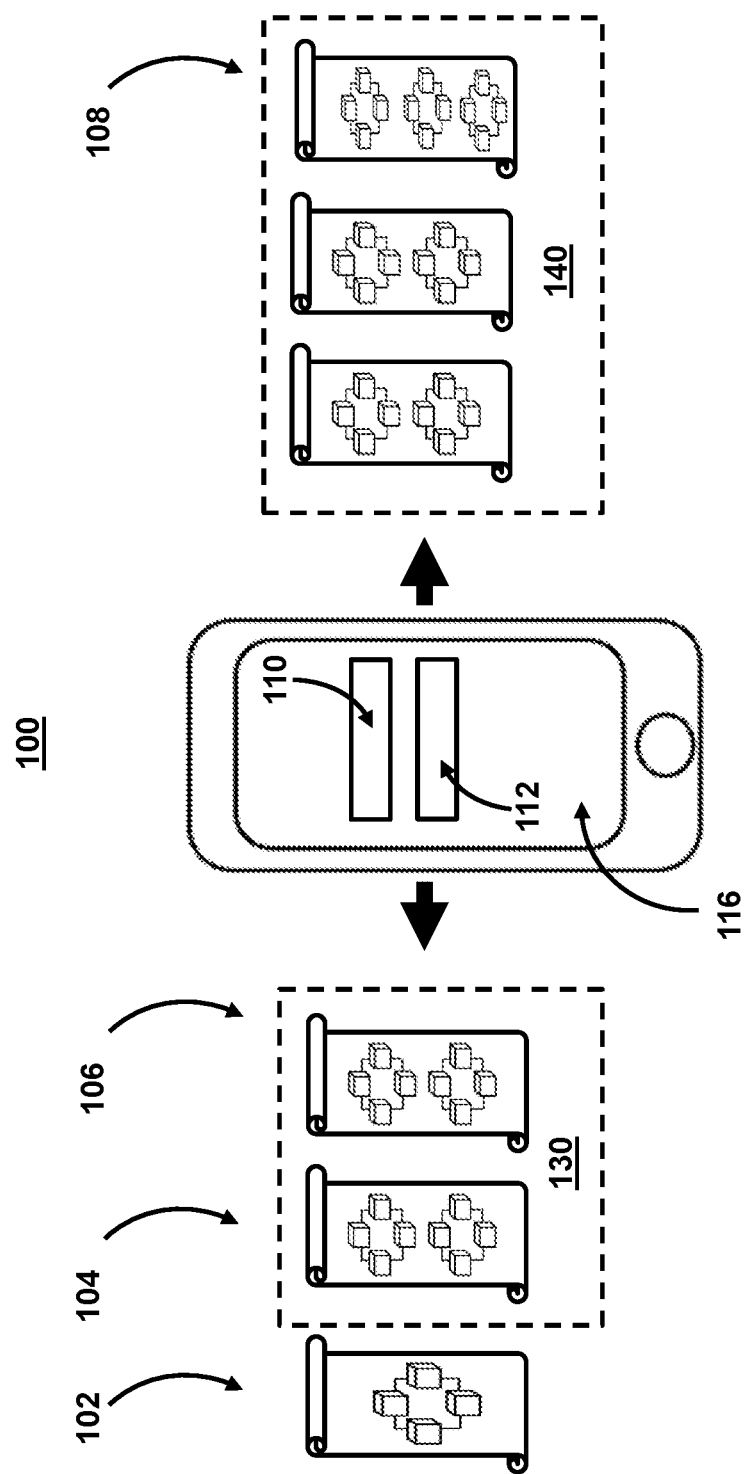
FIG. 1A shows an illustrative diagram for performing blockchain functions on designated batches of available cryptographic resources, in accordance with one or more embodiments.

FIG. 1A shows an illustrative diagram for performing blockchain functions on designated batches of available cryptographic resources, in accordance with one or more embodiments. For example, as described herein, the system uses a novel cryptographic resource standard. As described herein, a cryptographic resource may comprise any digital asset, cryptocurrency, and/or other value indicator. For example, a cryptographic resource may comprise anything that is stored digitally (or in other electronic means) and is uniquely identifiable that a user, entity, and/or organization can use to realize and/or reflect value. A cryptographic resource may comprise a fungible or non-fungible token. For example, a fungible token may comprise a fungible digital asset, whereas a non-fungible token may comprise a unique digital asset that represents ownership of real-world items like art, video clips, music, securities, and/or other interests. The cryptographic resource may conform to a set cryptographic resource standard.

As referred to herein, a "cryptographic resource standard" may comprise a set of rules that allow the development of a digital asset (e.g., a cryptocurrency token) on different blockchain protocols. In some embodiments, the cryptographic resource standard may comprise technical guidelines on developing a smart contract that defines a specific set of functions for the cryptographic resource standard, and which may facilitate the interaction between applications, smart contracts, and/or the cryptographic resource.

The cryptographic resource standard may include attributes that enable novel functionality (e.g., an originating batch designation and a receiving batch designation). For example, diagram 100 includes user interface 116 (e.g., implemented on a user device). As referred to herein, a "user interface" may comprise a human-computer interaction and communication in a device, and may include display screens, keyboards, a mouse, and the appearance of a desktop. For example, a user interface may comprise a way a user interacts with an application, website, and/or other content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same.

User interface 116 may be used to input (e.g., into field 110) an originating batch designation and input (e.g., into field 112) a receiving batch designation. As referred to herein, a "batch designation" may comprise any on-chain information used to distinguish one cryptographic resource from another cryptographic resource. The batch designation may be standard-specific (e.g., the batch designation may comprise one of a plurality of predetermined batch designations specific to a cryptographic resource standard) or the batch designation may be protocol-specific (e.g., the batch designation may comprise one of a plurality of predetermined batch designations specific to a blockchain protocol). The batch designation may also comprise an on-chain attribute of the cryptographic resource that is mutable. The batch designation may identify a relationship between one or more cryptographic resources irrespective of other attributes (e.g., irrespective of current or past ownership, irrespective of current blockchain address relationships, etc.). The batch designation may comprise an identifier for an on-chain group of one or more cryptographic resources that is based on a current state of the blockchain network.

For example, using one or more batch designations, the system may select one or more cryptographic resources (e.g., cryptographic resource 102, cryptographic resource 104, and/or cryptographic resource 106) that correspond to a specific batch designation. For example, the system may receive a first request to perform a first blockchain operation for a first cryptographic resource, wherein the first blockchain operation comprises a modification of one or more on-chain characteristics for the first cryptographic resource, and wherein the first cryptographic resource is a unique cryptographic record that exists on a blockchain and cannot be replicated. As referred to herein, "on-chain data" may comprise data that is publicly available information regarding transactions that have occurred on a particular blockchain network. For example, on-chain data may comprise data stored in one or more blocks constituting a blockchain. In contrast, "off-chain data" may comprise any data that is external to a blockchain, such as sports scores, weather data, and financial market data, as well as data on other blockchains.

In response to the first request, the system may generate a first query for attributes of a function for performing the first blockchain operation, and wherein the attributes are specific to a blockchain standard, and wherein the attributes include a first batch designation and a second batch designation, wherein the first batch designation comprises a first originating batch designation, and wherein the second batch designation comprises a first receiving batch designation. For example, the system may receive an originating batch designation via field 110, which is used to select batch 130 from cryptographic resource 102, cryptographic resource 104, and/or cryptographic resource 106.

The system may then generate a first function for the first blockchain operation, wherein the first function comprises the first originating batch designation and the first receiving batch designation. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related non-fungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a non-fungible token. A non-fungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

The system may then execute the first blockchain operation on batch 130, which may cause cryptographic resources in batch 130 to be re-batched into batch 140. Batch 140 may include additional cryptographic resources (e.g., cryptographic resource 108). For example, the system may execute, using a cryptographic storage application, the first blockchain operation, wherein executing the first blockchain operation causes an on-chain record for the first cryptographic resource to re-batch the first cryptographic resource into a batch of on-chain records corresponding to the first receiving batch designation.

FIG. 1B shows an illustrative function and pseudocode for facilitating cryptographically backed coordination of complex computer communications, in accordance with one or more embodiments. For example, FIG. 1B shows text string 150. Text string 150 may comprise a string segment. Text string 150 may be based on a cryptographic resource standard that generates an output string segment in which given rules are concatenated in an order that they are specified. Text string 150 may reflect various attributes and parameters that are defined by the cryptographic resource standard. For example, text string 150 may reflect the string rule output for events, notifications, labels, and cross-namespace naming rules specific to the cryptographic resource standard.

For example, the novel cryptographic resource standard includes individual cryptographic resource batch identifiers that represent a new configurable cryptographic resource type, which may have its own metadata, supply, and/or other attributes. For example, text string 150 may enable a new function type (e.g., function type 152), which allows for new functionality such as transferring multiple cryptographic resource types at once (e.g., in a batch), thereby saving on transaction costs, and which may allow the cryptographic resources to be re-batched. Through the use of the batch designations, the cryptographic resource standard enables operations tailored to a single cryptographic resource or a batch and/or semi-batch of cryptographic resources by allowing self-executing programs (e.g., smart contracts) to designate particular batches of cryptographic resources as well as categorize existing cryptographic resources into new tranches or batches (e.g., re-batch existing cryptographic resources). The designation of the cryptographic resources into the batch allows for future blockchain functions to batch these cryptographic resources together (e.g., in terms of ownership, single self-executing program execution, and/or interrelated operational dependencies between the cryptographic resources). Furthermore, this information is stored on-chain in order to take advantage of the decentralized nature of blockchain records. By doing so, the system may approve a transfer of a particular batch of cryptographic resources, without approving transfers of other cryptographic resources in a shared repository and/or collection, and without including the other cryptographic resources in the transfer.

As an extension of this functionality, the novel cryptographic resource standard enables self-executing programs to perform functions related to designated batches of cryptographic resources irrespective of whether the cryptographic resources are fungible or non-fungible and irrespective of a current cryptographic storage application (e.g., digital wallet) at which a cryptographic resource is currently linked. By doing so, self-executing programs may expand the functionality gained through communication with off-chain oracles to include downstream on-chain triggering events.

Text string 150 also includes various other attributes and parameters. For example, attribute 154 indicates a source address of a blockchain operation (e.g., where cryptographic resources subject to the blockchain operation will originate from). Attribute 156 indicates a target address of a blockchain operation (e.g., where cryptographic resources subject to the blockchain operation are targeted/sent). Attribute 158 indicates a list of cryptographic resources (e.g., what cryptographic resources are subject to the blockchain operation). Notably, this attribute deviates from other attributes in that the list function allows for multiple cryptographic resources to be included. Attribute 160 indicates a total value of cryptographic resources (e.g., how much/many cryptographic resources and/or a total value that is subject to the blockchain operation). Attribute 162 indicates additional freeform data for the blockchain operation (e.g., data that may indicate specific rules, constraints, etc.).

Text string 150 also includes attribute 164, which indicates a source batch of a blockchain operation (e.g., what batch cryptographic resources subject to the blockchain operation will originate from). Attribute 166 indicates a target batch of a blockchain operation (e.g., what batch cryptographic resources subject to the blockchain operation are re-batched to).

FIG. 1B also includes standard specification 170. Standard specification 170 include rules and procedures for implementing a cryptographic resource standard. Standard specification 170 includes safe transfer rules 172. Safe transfer rules 172 include requirements for a blockchain operation subject to the cryptographic resource standard that results in a reversible operation in case of error and/or fraud. For example, safe transfer rules 172 create an error if the attributes for the function (e.g., as shown in text string 150) do not correspond. Additionally, safe transfer rules 172 allow for multiple cryptographic resource types. For example, the cryptographic resource standard allows for multiple types of cryptographic resources to be subject to the same blockchain function and/or be re-batched together.

For example, using a function with standard specification 170, the system may receive, at a first self-executing program (e.g., a smart contract) that is accessible to a first blockchain node within a blockchain network, a first communication from a network oracle, wherein the first communication includes first off-chain data.

As referred to herein, a "network oracle" or simply "oracle" may comprise one or more blockchain oracles, which are entities that connect blockchains to external systems, thereby enabling smart contracts to execute based upon inputs and outputs from the real world. For example, the network oracle may comprise one or more blockchain oracles, which are entities that connect blockchains to external systems, thereby enabling smart contracts to execute based upon inputs and outputs from the real world. The off-chain data may comprise information about one or more real-world events that may trigger the execution of a blockchain function. The system may receive a second communication from the network oracle, wherein the second communication includes second off-chain data. The system may determine, based on the second off-chain data, a second blockchain function to perform on a second cryptographic resource batch having a second batch designation.

The system may then retrieve information included in text string 150 to determine whether to perform a blockchain function on a specific cryptographic resource batch. For example, the system may determine, based on the first off-chain data, a first blockchain function to perform, by the first self-executing program, on a first cryptographic resource batch having a first batch designation, wherein the first blockchain function comprises a modification of one or more on-chain characteristics for a first cryptographic resource, and wherein the first cryptographic resource is a unique cryptographic record that exists on the blockchain network and cannot be replicated.

Figure 2:
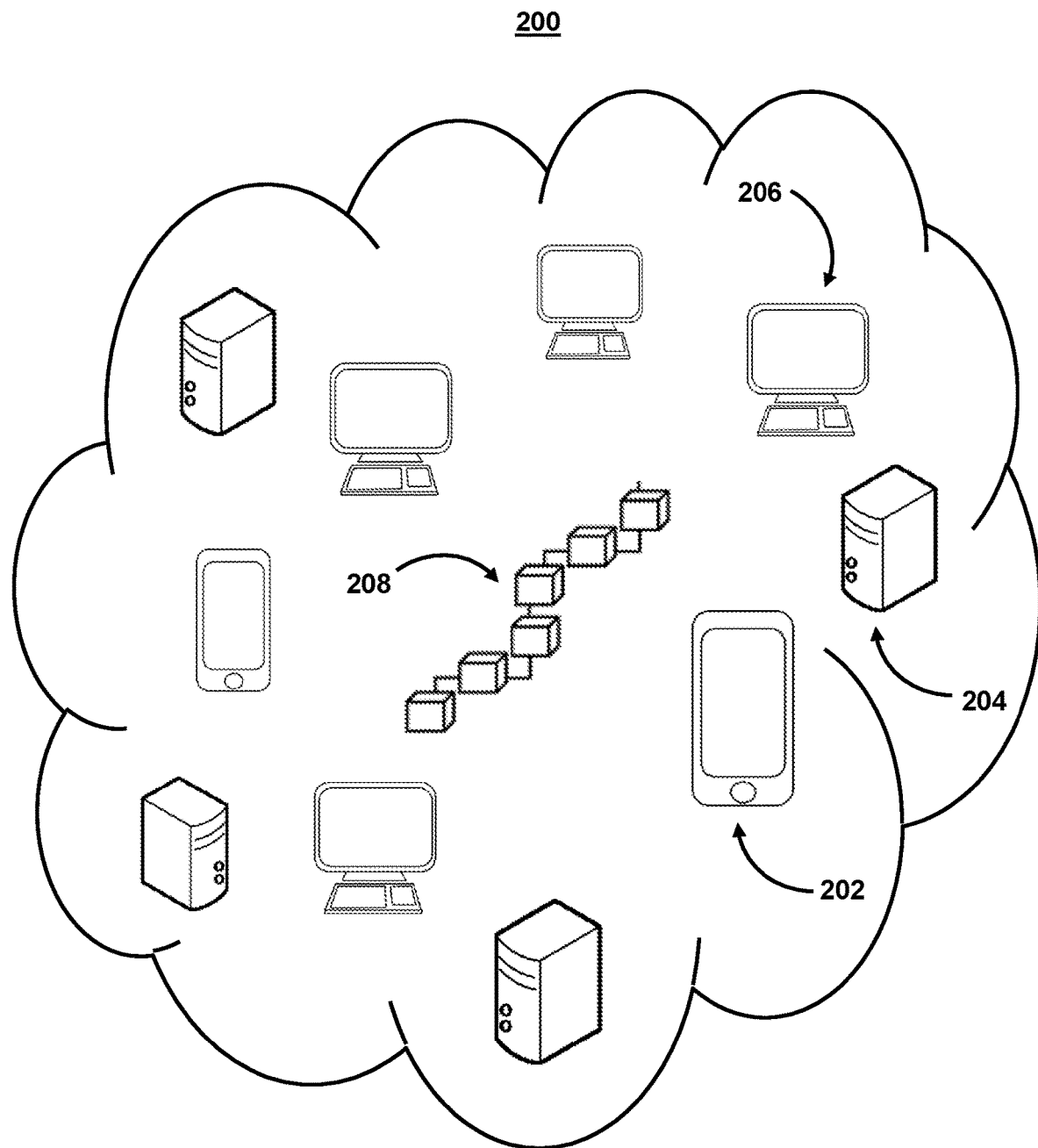
FIG. 2 shows an illustrative diagram for a system implementing a cryptographic resource standard with batch designations, in accordance with one or more embodiments.

FIG. 2 shows an illustrative diagram for a decentralized environment for performing blockchain functions, in accordance with one or more embodiments. For example, the diagram presents various components that may be used to implement a cryptographic resource standard with batch designation in some embodiments.

As shown in FIG. 2, system 200 may include multiple user devices (e.g., user device 202, user device 204, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually. Each of the user devices may be used by the system to conduct blockchain functions and/or contribute to implementing a cryptographic resource standard with batch designation.

As shown in FIG. 2, one or more user devices may include a digital wallet used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As referred to herein, a cryptography-based digital repository may comprise a digital wallet. For example, a cryptography-based digital repository or a cryptography-based storage application may refer to a digital wallet. A digital wallet may comprise a software-based system that securely (and typically in an encrypted format) stores users, confidential information, personal information, payment information, and/or passwords for numerous payment methods and websites. By using a digital wallet, users can complete communications, purchases, and/or other blockchain functions easily and securely without risking the information becoming public or subject to a cyberattack. For example, a custodial cryptography-based storage application may be a cryptography-based storage application that is managed by a third-party exchange. For example, the custodial cryptography-based storage application may be a platform cryptography-based storage application such that the custodial cryptography-based storage application is managed by a blockchain platform service. For custodial cryptography-based storage applications, an exchange (e.g., the blockchain platform service) may store and manage keys (e.g., private keys) corresponding to a user account (e.g., corresponding to a blockchain address). The exchange may be tasked with securely storing funds (e.g., cryptocurrencies) and/or facilitating blockchain functions based on the funds. In some embodiments, the custodial cryptography-based storage application may be a cold storage hardware wallet. In such cases, the funds may be stored securely on designated hardware in order to provide additional security. Alternatively, some embodiments may use a non-custodial cryptography-based storage application, which may be browser-based (e.g., software installed on mobile devices).

As shown in FIG. 2, one or more user devices may include a private key and/or digital signature. For example, system 200 may use cryptographic systems for conducting blockchain functions such as implementing a cryptographic resource standard with batch designation. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system

200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a means for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined number of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
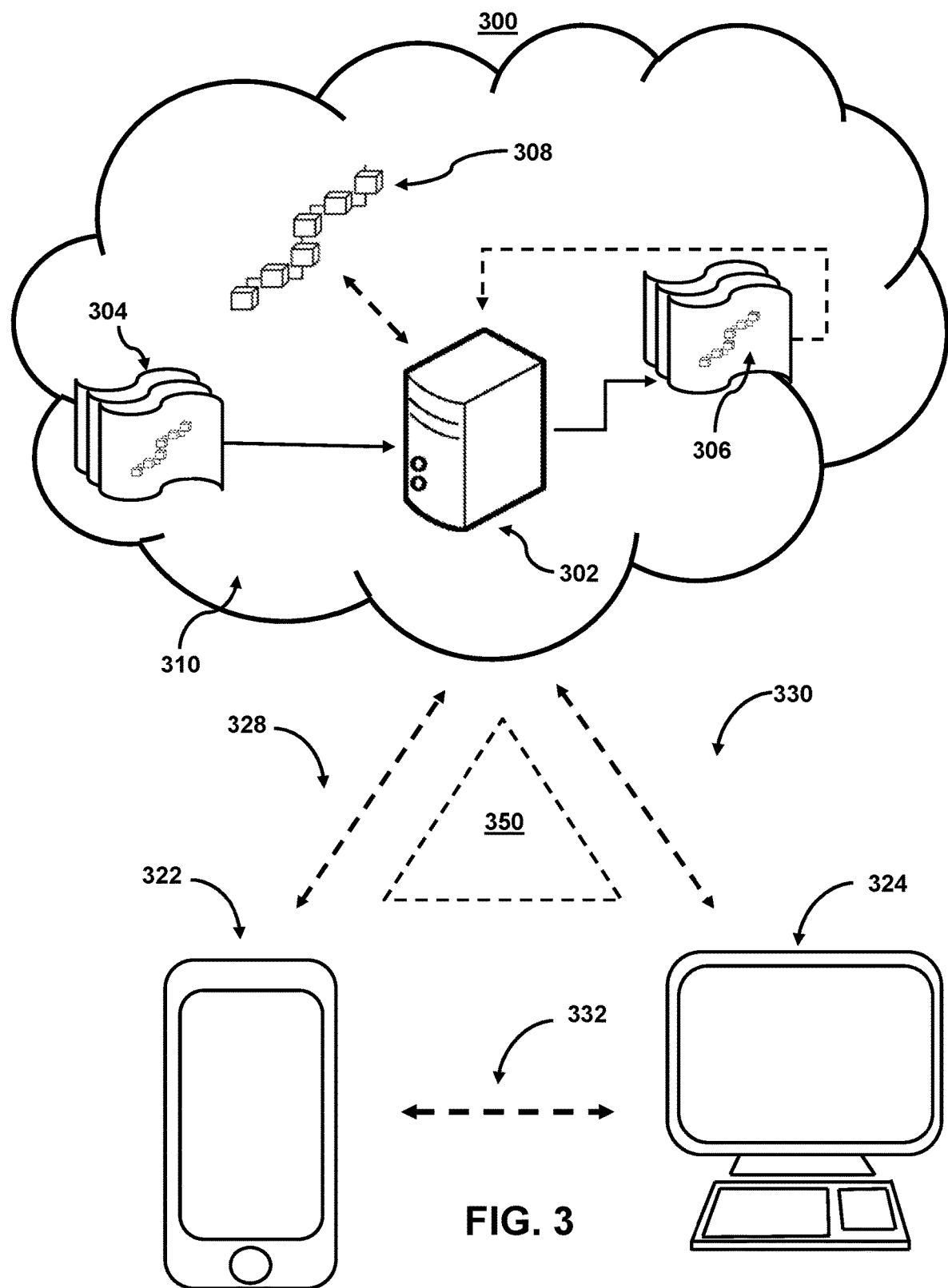
FIG. 3 shows illustrative components for a system using a cryptographic resource standard with batch designations, in accordance with one or more embodiments.

FIG. 3 shows illustrative components for a system using a cryptographic resource standard with batch designations, in accordance with one or more embodiments. For example, FIG. 3 may show illustrative components for using a cryptographic resource standard with batch designations. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should be noted that system 300 is not limited to three devices. Users may, for instance, utilize one or more devices to interact with one another, one or more servers, or other components of system 300. It should also be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication paths or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, deep learning model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., related to a batch designation, function performed by a batch designation, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back-propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether a given input corresponds to a classification of model 302 (e.g., related to a batch designation, function performed by a batch designation, etc.).

In some embodiments, the model (e.g., model 302) may automatically perform actions based on outputs 306. In some embodiments, the model (e.g., model 302) may not perform any actions. The output of the model (e.g., model 302) may be used to perform blockchain functions based on batch designations with respect to blockchain 308.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in business-to-business transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between the front-end layer and the back-end layer. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
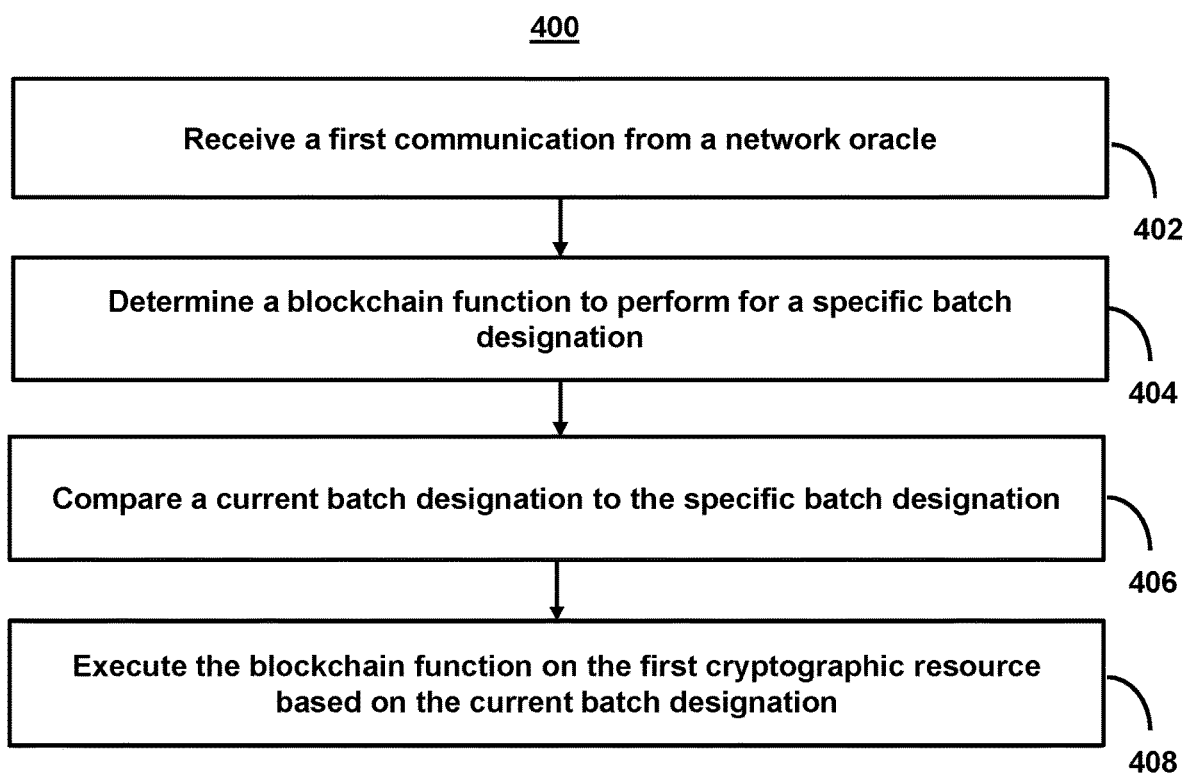
FIG. 4 shows a flowchart of the steps involved in performing blockchain functions on designated batches of available cryptographic resources, in accordance with one or more embodiments.

FIG. 4 shows a flowchart of the steps involved in performing blockchain functions on designated batches of available cryptographic resources, in accordance with one or more embodiments. In some embodiments, cryptographic resources (e.g., non-fungible tokens) may be used to manage the ownership/decision-making/membership of organizations in a way that rewards performance/participation/other actions. By embedding cryptographic resources that signify ownership/decision-making rights/membership within smart contracts, these cryptographic resources may be distributed in the future based on some criteria agreed to by the organization's founders. In one example, an organization, such as an investment fund, establishes ownership via cryptographic resources (e.g., each cryptographic resource of 100 minted cryptographic resources may represent a one percent ownership interest in the fund and one vote). The self-executing program may also include instructions to mint an additional 1,000 cryptographic resources upon certain conditions and transfer these cryptographic resources to an account or issue a private key for these cryptographic resources to a user. These cryptographic resources may be programmed to calculate the total return for all investments that a particular cryptographic resource holder voted for such that each cryptographic resource holder's total return is the return of all the investments for which that cryptographic resource holder voted yes. In this way, those cryptographic resource holders that voted yes for the most successful investments will have a higher total return on investment than those cryptographic resource holders that voted yes for less successful investments. The off-chain information required to power this system (e.g., investment return information) may be provided by one or multiple oracles. Based on investment performance, the cryptographic resources allocate the cryptographic resources embedded within them to the cryptographic resource holders with the highest total return on investment. In this way, over time the most successful investors will have an increasing ownership and/ or decision-making share in the fund.

At step 402, process 400 (e.g., using one or more components described above) receives a first communication from a network oracle. For example, the system may receive, at a first self-executing program that is accessible to a first blockchain node within a blockchain network, a first communication from a network oracle, wherein the first communication includes first off-chain data. For example, the self-executing program may comprise a smart contract. A smart contract may comprise one or more programs stored on a blockchain that run when predetermined conditions are met. The smart contract may be used to automate the execution of an agreement so that all participants can be immediately certain of the outcome, without any intermediary's involvement or time loss.

At step 404, process 400 (e.g., using one or more components described above) determines a blockchain function to perform for a specific batch designation. For example, the system may determine, based on the first off-chain data, a first blockchain function to perform, by the first self-executing program, on a first cryptographic resource batch having a first batch designation.

In some embodiments, the system may analyze one or more values in the off-chain data. For example, the system may determine a value of the first off-chain data. The system may then compare the value to a threshold value. In response to determining that the value corresponds to the threshold value, the system may select the first blockchain function from a plurality of blockchain functions.

In some embodiments, the system may analyze a geographic location in the off-chain data. For example, the system may determine a geographic location corresponding to the first off-chain data. The system may compare the geographic location to a predetermined location. In response to determining that the geographic location corresponds to the predetermined location, the system may select the first blockchain function from a plurality of blockchain functions.

In some embodiments, the system may analyze a rate of change in the off-chain data. For example, the system may determine a rate of change corresponding to the first off-chain data. The system may compare the rate of change to a predetermined rate of change. In response to determining that the rate of change corresponds to the predetermined rate of change, the system may select the first blockchain function from a plurality of blockchain functions.

In some embodiments, the system may analyze a date or other time metric in the off-chain data. For example, the system may determine a date corresponding to the first off-chain data. The system may compare the date to a predetermined date. The system may, in response to determining that the date corresponds to the predetermined date, select the first blockchain function from a plurality of blockchain functions.

In some embodiments, the system may analyze a credential, password, and/or other authorization code in the off-chain data. For example, the system may determine an authorization code corresponding to the first off-chain data. The system may compare the authorization code to a predetermined authorization code. The system may, in response to determining that the authorization code corresponds to the predetermined authorization code, select the first blockchain function from a plurality of blockchain functions.

At step 406, process 400 (e.g., using one or more components described above) compares a current batch designation to the specific batch designation. For example, the system may compare, by the first self-executing program, a current batch designation of a first cryptographic resource to a first batch designation to determine whether the first cryptographic resource corresponds to the first cryptographic resource batch.

In some embodiments, comparing the current batch designation of the first cryptographic resource to the first batch designation to determine whether the first cryptographic resource corresponds to the first cryptographic resource batch may further comprise the system retrieving a plurality of attributes of the first cryptographic resource, wherein the plurality of attributes are specific to a blockchain standard, and wherein the plurality of attributes include the current batch designation. The system may then retrieve, from the first self-executing program, a first attribute for the first blockchain function, wherein the first attribute is an originating batch designation. The system may then compare the current batch designation to the originating batch designation.

For example, as shown in FIG. 1B above, the novel cryptographic resource standard may comprise a format that includes a plurality of attributes. For example, the system may compare the current batch designation of a first cryptographic resource to a first batch designation to determine whether the first cryptographic resource corresponds to the first cryptographic resource batch. To do so, the system may retrieve a plurality of attributes of the first cryptographic resource, wherein the plurality of attributes are specific to a blockchain standard, and wherein the plurality of attributes include the current batch designation. The system may retrieve, from the first self-executing program, a first attribute for the first blockchain function, wherein the first attribute is an originating batch designation. The system may compare the current batch designation to the originating batch designation.

At step 408, process 400 (e.g., using one or more components described above) executes the blockchain function on the first cryptographic resource based on the current batch designation. For example, the system may, in response to determining that the first cryptographic resource corresponds to the first cryptographic resource batch, execute the first blockchain function on the first cryptographic resource. In contrast, the system may not execute a blockchain function in response to determining that a cryptographic resource does not correspond to a cryptographic resource batch. For example, the system may compare, by the first self-executing program, a second batch designation of a second cryptographic resource to a first batch designation to determine whether the second cryptographic resource corresponds to the first cryptographic resource batch. In response to determining that the second cryptographic resource does not correspond to the first cryptographic resource batch, the system may not execute the first blockchain function on the second cryptographic resource.

In some embodiments, the system may execute the first blockchain function on the first cryptographic resource by generating a new cryptographic resource. For example, the system may mint a new cryptographic resource. The system may determine a cryptographic storage application storing a first private key for the first cryptographic resource. The system may then transfer a new private key for the new cryptographic resource to the cryptographic storage application.

In some embodiments, the system may execute the first blockchain function on the first cryptographic resource that re-batches the first cryptographic resource. For example, the system may retrieve, from the first self-executing program, a second attribute for the first blockchain function, wherein the second attribute is a receiving batch designation. The system may cause an on-chain record for the first cryptographic resource to re-batch the first cryptographic resource into a batch of on-chain records corresponding to the receiving batch designation. For example, the first blockchain function may comprise a modification of one or more on-chain characteristics for the first cryptographic resource, and wherein the first cryptographic resource is a unique cryptographic record that exists on the blockchain network and cannot be replicated.

In some embodiments, the first blockchain function may further comprise a first originating address and a first receiving address, wherein the first originating address identifies a first cryptographic storage application from which to transfer the first cryptographic resource, wherein the first receiving address identifies a second cryptographic storage application to transfer the first cryptographic resource to, and wherein the first originating address and the first receiving address are compatible with a plurality of blockchain protocols. For example, the batch designations may be specific to a given blockchain network and/or protocol. For example, while an address of a user account and/or cryptography-based digital repository may support multiple blockchain protocols, the batch designation may be compatible with only a single blockchain protocol.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
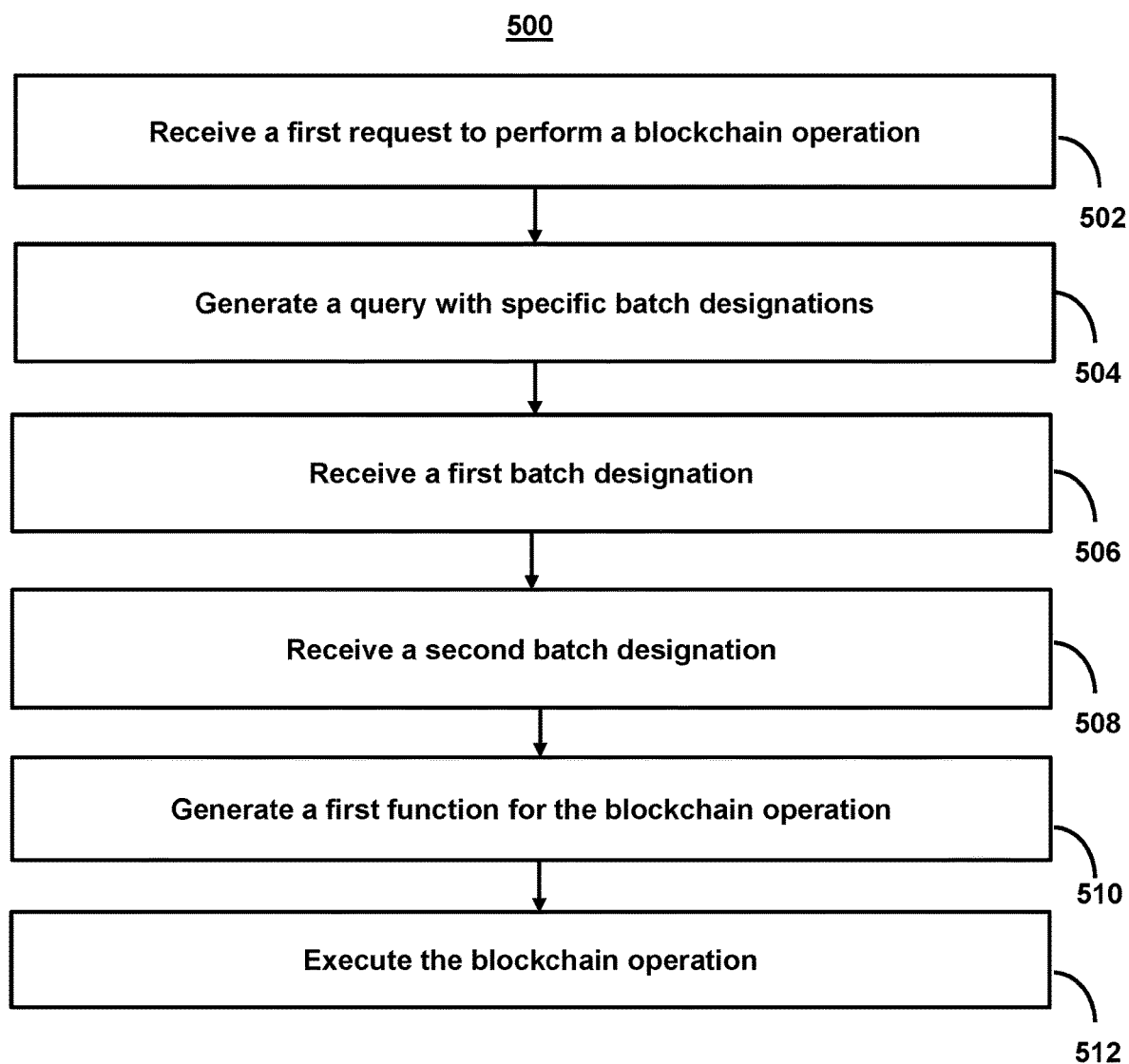
FIG. 5 shows a flowchart of the steps involved in facilitating cryptographically backed coordination of complex computer communications, in accordance with one or more embodiments.

FIG. 5 shows a flowchart of the steps involved in facilitating cryptographically backed coordination of complex computer communications, in accordance with one or more embodiments. For example, as opposed to conventional blockchain operations, the system may use an unconventional and novel cryptographic resource standard that allows a user to select different batch designations for the blockchain operation. The batch designations may be used to select specific cryptographic resources from a repository or collection for the blockchain operation.

In some embodiments, a non-fungible token or other cryptographic resource could be designed to effectively "own" other cryptographic resources. The cryptographic resource may be used to represent ownership interest, including complicated ownership relationships, which enables the creation of more complex investment securities products on blockchain-based platforms. For example, the cryptographic resource may represent a Collateralized Debt Obligation ("CDO"), a common financial instrument that is offered via traditional exchanges but that does not exist in blockchain-based platforms. A CDO consists of a pool of loans or other assets. Investors can buy CDOs that represent an ownership interest entitling them to the cashflows generated by the pool of loans or other assets. CDOs can be structured in "tranches" such that if cash flows are limited, more senior tranches get paid out in full before more junior tranches receive any cash flow. Such an instrument could be re-created in blockchain-based platforms leveraging a cryptographic resource of a cryptographic resource hierarchical structure whereby an investor buys a CDO cryptographic resource, giving the investor an ownership interest in the CDO. The CDO cryptographic resource "owns" additional cryptographic resources that represent an ownership interest in each of the underlying loans or assets that serve as the pool backing the CDO— effectively, ownership of the CDO. The cryptographic resource represents ownership in the pool of assets underlying the CDO. The underlying cryptographic resources can be embedded within smart contracts to create "tranching" for the CDO product, releasing cryptographic resource ownership interest to more junior tranches only once the more senior tranches have been paid out.

At step 502, process 500 (e.g., using one or more components described above) receives a first request to perform a blockchain operation. For example, the system may receive a first request to perform a first blockchain operation for a first cryptographic resource. For example, the system may receive a first request to perform a blockchain operation. For example, the system may receive a request to perform a transfer of a cryptographic resource such as a non-fungible token.

At step 504, process 500 (e.g., using one or more components described above) generates a query with specific batch designations. For example, the system may, in response to the first request, generate a first query for a first batch designation and a second batch designation, wherein the first batch designation comprises a first originating batch designation, and wherein the second batch designation comprises a first receiving batch designation. For example, generating the first query may comprise the system querying a user for attributes of a function for performing the first blockchain operation, and wherein the attributes are specific to a blockchain standard.

In some embodiments, the first query further comprises a first originating address and a first receiving address, wherein the first originating address identifies a first cryptographic storage application from which to transfer the first cryptographic resource, wherein the first receiving address identifies a second cryptographic storage application to transfer the first cryptographic resource to, and wherein the first originating address and the first receiving address are compatible with a plurality of blockchain protocols, and wherein the first batch designation and the second batch designation are compatible with only a first blockchain protocol. For example, the batch designations may be specific to a given blockchain network and/or protocol. For example, while an address of a user account and/or cryptography-based digital repository may support multiple blockchain protocols, the batch designation may be compatible with only a single blockchain protocol.

At step 506, process 500 (e.g., using one or more components described above) receives a first batch designation. For example, the system may receive a first user input providing the first batch designation. For example, the system may receive a batch designation via input field 110 (FIG. 1A). By doing so, the system may allow a user to select a type or batch of cryptographic resources upon which a blockchain operation may be performed.

The system may use batch designations to determine whether a given blockchain operation may be performed. For example, the system may determine whether a current batch designation of a cryptographic resource corresponds to the batch designation of an originating batch designation (e.g., the batch designation called for by the blockchain operation). If the designations match, the system may perform the blockchain operation. If the designations do not match, the system may not perform the blockchain operation. Instead, the system may generate an error and/or query the user to update the batch designation.

For example, the system may determine a current batch designation of the first cryptographic resource. The system may then compare the current batch designation of the first cryptographic resource to the originating batch designation. In response to determining that the current batch designation corresponds to the first originating batch designation, the system may determine to execute the first blockchain operation.

In some embodiments, the system may need to query one or more sources of information. For example, the current batch designation may comprise on-chain information. That is, the current batch designation may be stored on-chain and thus accessible and/or verifiable to the blockchain network. For example, the system may determine the current batch designation of the first cryptographic resource by querying a first blockchain node of a first blockchain network for the current batch designation and receiving the current batch designation from the first blockchain node.

Additionally or alternatively, the system may receive a second request to perform a second blockchain operation for a second cryptographic resource. The system may determine a batch designation of the second cryptographic resource. The system may determine a second originating batch designation for the second blockchain operation. The system may compare the current batch designation of the second cryptographic resource to the second originating batch designation. The system may, in response to determining that the current batch designation of the second cryptographic resource does not correspond to the second originating batch designation, determine not to execute the second blockchain operation.

For example, the system may automatically generate functions and/or automatically populate characteristics about the functions. In particular, the system may generate these functions in response to a previous function failing to execute. These characteristics may include the originating batch designation. For example, in response to determining that the current batch designation of the second cryptographic resource does not correspond to the second originating batch designation, the system may generate a second query, wherein the second query includes a third batch designation. The system may generate a second function for the second blockchain operation using the third batch designation.

In some embodiments, a batch designation may be specific to a given blockchain protocol (e.g., a blockchain network). That is, each blockchain network may include a plurality of designations that indicate different batches of cryptographic resources on the blockchain network. For example, each batch designation may include a unique identifier and/or serial number specific to the batch. By doing so, the system may allow for numerous types of tranches to be created for the blockchain network. For example, the system may determine a first blockchain protocol for the first blockchain operation. The system may determine a plurality of batch designations for the first blockchain protocol.

In some embodiments, the system may automatically determine if an inputted batch designation matches a batch designation for the blockchain network. By doing so, the system may ensure that a batch designation was not erroneously made and/or is not fraudulent. For example, the system may, in response to receiving the first user input, provide the first batch designation. The system may compare the first batch designation to the plurality of batch designations. The system may, in response to determining that the first batch designation matches at least one batch designation of the plurality of batch designations, determine to generate the first function.

For example, the system may automatically generate a new receiving batch designation in response to a user entering a receiving batch designation that does not match one of the plurality of batch designations. For example, the system may, in response to receiving the second user input, provide the second batch designation. The system may compare the second batch designation to the plurality of batch designations. The system may, in response to determining that the second batch designation does not match at least one batch designation of the plurality of batch designations, generate a user query to create a new batch designation.

At step 508, process 500 (e.g., using one or more components described above) receives a second batch designation. For example, the system may receive a second user input providing the second batch designation. For example, the system may receive a batch designation via input field 112 (FIG. 1A). By doing so, the system may allow a user to select a type or batch of cryptographic resources that any cryptographic resources subject to a blockchain operation will be re-batched into.

At step 510, process 500 (e.g., using one or more components described above) generates a first function for the blockchain operation. For example, the system may, in response to receiving both the first user input and the second user input, generate a first function for the first blockchain operation, wherein the first function comprises the first originating batch designation and the first receiving batch designation.

At step 512, process 500 (e.g., using one or more components described above) executes the blockchain operation. For example, the system may execute the first blockchain operation. For example, the system may execute the first blockchain operation, which causes an on-chain record for the first cryptographic resource to re-batch the first cryptographic resource into a batch of on-chain records corresponding to the first receiving batch designation.

In some embodiments, the system may perform additional steps prior to execution. For example, the system may determine a first originating address for the first blockchain operation. The system may determine cryptographic resources available at the first originating address. The system may determine whether the cryptographic resources available at the first originating address correspond to the first cryptographic resource. The system may determine whether the cryptographic resources available at the first originating address correspond to the first originating batch designation. In some embodiments, the system may determine whether an originating address (e.g., a digital wallet) includes a cryptographic resource corresponding to one at issue in the blockchain operation and whether the cryptographic resource has a batch designation corresponding to the batch designation at issue.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for performing blockchain functions on designated batches of available cryptographic resources irrespective of whether the available cryptographic resources are fungible or non-fungible and irrespective of current cryptographic storage application associations of the available cryptographic resources.

2. The method of the preceding embodiment, further comprising receiving, at a first self-executing program that is accessible to a first blockchain node within a blockchain network, a first communication from a network oracle, wherein the first communication includes first off-chain data; determining, based on the first off-chain data, a first blockchain function to perform, by the first self-executing program, on a first cryptographic resource batch having a first batch designation; comparing, by the first self-executing program, a current batch designation of a first cryptographic resource to a first batch designation to determine whether the first cryptographic resource corresponds to the first cryptographic resource batch; and in response to determining that the first cryptographic resource corresponds to the first cryptographic resource batch, executing the first blockchain function on the first cryptographic resource.

3. The method of any one of the preceding embodiments, wherein comparing the current batch designation of the first cryptographic resource to the first batch designation to determine whether the first cryptographic resource corresponds to the first cryptographic resource batch further comprises: retrieving a plurality of attributes of the first cryptographic resource, wherein the plurality of attributes are specific to a blockchain standard, and wherein the plurality of attributes include the current batch designation; retrieving, from the first self-executing program, a first attribute for the first blockchain function, wherein the first attribute is an originating batch designation; and comparing the current batch designation to the originating batch designation.

4. The method of any one of the preceding embodiments, further comprising: comparing, by the first self-executing program, a second batch designation of a second cryptographic resource to the first batch designation to determine whether the second cryptographic resource corresponds to the first cryptographic resource batch; and in response to determining that the second cryptographic resource does not correspond to the first cryptographic resource batch, not executing the first blockchain function on the second cryptographic resource.

5. The method of any one of the preceding embodiments, wherein executing the first blockchain function on the first cryptographic resource further comprises: minting a new cryptographic resource; determining a cryptographic storage application storing a first private key for the first cryptographic resource; and transferring a new private key for the new cryptographic resource to the cryptographic storage application.

6. The method of any one of the preceding embodiments, wherein executing the first blockchain function on the first cryptographic resource further comprises: retrieving, from the first self-executing program, a second attribute for the first blockchain function, wherein the second attribute is a receiving batch designation; and causing an on-chain record for the first cryptographic resource to re-batch the first cryptographic resource into a batch of on-chain records corresponding to the receiving batch designation.

7. The method of any one of the preceding embodiments, wherein the first blockchain function comprises a modification of one or more on-chain characteristics for the first cryptographic resource, and wherein the first cryptographic resource is a unique cryptographic record that exists on the blockchain network and cannot be replicated.

8. The method of any one of the preceding embodiments, wherein the first blockchain function further comprises a first originating address and a first receiving address, wherein the first originating address identifies a first cryptographic storage application from which to transfer the first cryptographic resource, wherein the first receiving address identifies a second cryptographic storage application to transfer the first cryptographic resource to, and wherein the first originating address and the first receiving address are compatible with a plurality of blockchain protocols.

9. The method of any one of the preceding embodiments, wherein determining, based on the first off-chain data, the first blockchain function to perform on the first cryptographic resource batch having the first batch designation further comprises: determining a value of the first off-chain data; comparing the value to a threshold value; and in response to determining that the value corresponds to the threshold value, selecting the first blockchain function from a plurality of blockchain functions.

10. The method of any one of the preceding embodiments, wherein determining, based on the first off-chain data, the first blockchain function to perform on the first cryptographic resource batch having the first batch designation further comprises: determining a geographic location corresponding to the first off-chain data; comparing the geographic location to a predetermined location; and in response to determining that the geographic location corresponds to the predetermined location, selecting the first blockchain function from a plurality of blockchain functions.

11. The method of any one of the preceding embodiments, wherein determining, based on the first off-chain data, the first blockchain function to perform on the first cryptographic resource batch having the first batch designation further comprises: determining a rate of change corresponding to the first off-chain data; comparing the rate of change to a predetermined rate of change; and in response to determining that the rate of change corresponds to the predetermined rate of change, selecting the first blockchain function from a plurality of blockchain functions.

12. The method of any one of the preceding embodiments, wherein determining, based on the first off-chain data, the first blockchain function to perform on the first cryptographic resource batch having the first batch designation further comprises: determining a date corresponding to the first off-chain data; comparing the date to a predetermined date; and in response to determining that the date corresponds to the predetermined date, selecting the first blockchain function from a plurality of blockchain functions.

13. The method of any one of the preceding embodiment, wherein determining, based on the first off-chain data, the first blockchain function to perform on the first cryptographic resource batch having the first batch designation further comprises: determining an authorization code corresponding to the first off-chain data; comparing the authorization code to a predetermined authorization code; and in response to determining that the authorization code corresponds to the predetermined authorization code, selecting the first blockchain function from a plurality of blockchain functions.

14. The method of any one of the preceding embodiments, further comprising: receiving a second communication from the network oracle, wherein the second communication includes second off-chain data; and determining, based on the second off-chain data, a second blockchain function to perform on a second cryptographic resource batch having a second batch designation.

15. A method for performing blockchain functions on designated batches of available cryptographic resources irrespective of whether the available cryptographic resources are fungible or non-fungible and irrespective of current cryptographic storage application associations of the available cryptographic resources.

16. The method of the preceding embodiment, further comprising: receiving, at a first self-executing program that is accessible to a first blockchain node within a blockchain network, a first communication from a network oracle, wherein the first communication includes first off-chain data; determining, based on the first off-chain data, a first blockchain function to perform, by the first self-executing program, on a first cryptographic resource batch having a first batch designation; comparing, by the first self-executing program, a current batch designation of a first cryptographic resource to the first batch designation to determine whether the first cryptographic resource corresponds to the first cryptographic resource batch; and in response to determining that the first cryptographic resource corresponds to the first cryptographic resource batch, executing the first blockchain function on the first cryptographic resource.

17. The method of any one of the preceding embodiments, wherein comparing the current batch designation of the first cryptographic resource to the first batch designation to determine whether the first cryptographic resource corresponds to the first cryptographic resource batch further comprises: retrieving a plurality of attributes of the first cryptographic resource, wherein the plurality of attributes are specific to a blockchain standard, and wherein the plurality of attributes include the current batch designation; retrieving, from the first self-executing program, a first attribute for the first blockchain function, wherein the first attribute is an originating batch designation; and comparing the current batch designation to the originating batch designation.

18. The method of any one of the preceding embodiments, further comprising: comparing, by the first self-executing program, a second batch designation of a second cryptographic resource to the first batch designation to determine whether the second cryptographic resource corresponds to the first cryptographic resource batch; and in response to determining that the second cryptographic resource does not correspond to the first cryptographic resource batch, not executing the first blockchain function on the second cryptographic resource.

19. The method of any one of the preceding embodiments, wherein executing the first blockchain function on the first cryptographic resource further comprises: minting a new cryptographic resource; determining a cryptographic storage application storing a first private key for the first cryptographic resource; and transferring a new private key for the new cryptographic resource to the cryptographic storage application.

20. The method of any one of the preceding embodiments, wherein executing the first blockchain function on the first cryptographic resource further comprises: retrieving, from the first self-executing program, a second attribute for the first blockchain function, wherein the second attribute is a receiving batch designation; and causing an on-chain record for the first cryptographic resource to re-batch the first cryptographic resource into a batch of on-chain records corresponding to the receiving batch designation.

21. The method of any one of the preceding embodiments, wherein the first blockchain function comprises a modification of one or more on-chain characteristics for the first cryptographic resource, and wherein the first cryptographic resource is a unique cryptographic record that exists on the blockchain network and cannot be replicated.

22. The method of any one of the preceding embodiments, wherein the first blockchain function further comprises a first originating address and a first receiving address, wherein the first originating address identifies a first cryptographic storage application from which to transfer the first cryptographic resource, wherein the first receiving address identifies a second cryptographic storage application to transfer the first cryptographic resource to, and wherein the first originating address and the first receiving address are compatible with a plurality of blockchain protocols.

23. The method of any one of the preceding embodiments, wherein determining, based on the first off-chain data, the first blockchain function to perform on the first cryptographic resource batch having the first batch designation further comprises: determining a value of the first off-chain data; comparing the value to a threshold value; and in response to determining that the value corresponds to the threshold value, selecting the first blockchain function from a plurality of blockchain functions.

24. The method of any one of the preceding embodiments, wherein determining, based on the first off-chain data, the first blockchain function to perform on the first cryptographic resource batch having the first batch designation further comprises: determining a geographic location corresponding to the first off-chain data; comparing the geographic location to a predetermined location; and in response to determining that the geographic location corresponds to the predetermined location, selecting the first blockchain function from a plurality of blockchain functions.

25. The method of any one of the preceding embodiments, wherein determining, based on the first off-chain data, the first blockchain function to perform on the first cryptographic resource batch having the first batch designation further comprises: determining a rate of change corresponding to the first off-chain data; comparing the rate of change to a predetermined rate of change; and in response to determining that the rate of change corresponds to the predetermined rate of change, selecting the first blockchain function from a plurality of blockchain functions.

26. The method of any one of the preceding embodiments, wherein determining, based on the first off-chain data, the first blockchain function to perform on the first cryptographic resource batch having the first batch designation further comprises: determining a date corresponding to the first off-chain data; comparing the date to a predetermined date; and in response to determining that the date corresponds to the predetermined date, selecting the first blockchain function from a plurality of blockchain functions.

27. The method of any one of the preceding embodiments, wherein determining, based on the first off-chain data, the first blockchain function to perform on the first cryptographic resource batch having the first batch designation further comprises: determining an authorization code corresponding to the first off-chain data; comparing the authorization code to a predetermined authorization code; and in response to determining that the authorization code corresponds to the predetermined authorization code, selecting the first blockchain function from a plurality of blockchain functions.

28. The method of any one of the preceding embodiments, further comprising: receiving a second communication from the network oracle, wherein the second communication includes second off-chain data; and determining, based on the second off-chain data, a second blockchain function to perform on a second cryptographic resource batch having a second batch designation.

29. A tangible, non-transitory, machine-readable medium storing instructions that, when executed by a data processing apparatus, cause the data processing apparatus to perform operations comprising those of any of embodiments 1-28.

30. A system comprising one or more processors; and memory storing instructions that, when executed by the processors, cause the processors to effectuate operations comprising those of any of embodiments 1-28.

31. A system comprising means for performing any of embodiments 1-28.

What is claimed is:

1. A system for facilitating cryptographically-backed coordination of complex computer communications by using cryptographic resource standards that provide designations for batching, the system comprising:
    one or more processors; and
    a non-transitory, computer-readable medium comprising instructions recorded thereon, that when executed by the one or more processors, causes operations comprising:
        receiving a first request to perform a first blockchain operation for a first cryptographic resource, wherein the first blockchain operation comprises a modification of one or more on-chain characteristics for the first cryptographic resource, and wherein the first cryptographic resource is a unique cryptographic record that exists on a blockchain and cannot be replicated;
        in response to the first request, generating a first query for attributes of a function for performing the first blockchain operation, wherein the attributes are specific to a blockchain standard, and wherein the attributes include a first batch designation and a second batch designation, wherein the first batch designation comprises a first originating batch designation, and wherein the second batch designation comprises a first receiving batch designation;
        receiving a first user input providing the first batch designation;
        receiving a second user input providing the second batch designation;
        in response to receiving both the first user input and the second user input, generating a first function for the first blockchain operation, wherein the first function comprises the first originating batch designation and the first receiving batch designation; and
        executing, using a cryptographic storage application, the first blockchain operation, wherein executing the first blockchain operation causes an on-chain record for the first cryptographic resource to re-batch the first cryptographic resource into a batch of on-chain records corresponding to the first receiving batch designation.

2. A method for facilitating cryptographically-backed coordination of complex computer communications by using cryptographic resource standards that provide designations for batching, the method comprising:
    receiving a first request to perform a first blockchain operation for a first cryptographic resource;
    determining a first originating address for the first blockchain operation;
    determining cryptographic resources available at the first originating address;
    determining whether the cryptographic resources available at the first originating address correspond to the first cryptographic resource;

in response to the first request, generating a first query for a first batch designation and a second batch designation, wherein the first batch designation comprises a first originating batch designation, and wherein the second batch designation comprises a first receiving batch designation;

determining whether the cryptographic resources available at the first originating address correspond to the first originating batch designation;

receiving a first user input providing the first batch designation;

receiving a second user input providing the second batch designation;

in response to receiving both the first user input and the second user input, generating a first function for the first blockchain operation, wherein the first function comprises the first originating batch designation and the first receiving batch designation; and executing the first blockchain operation.

3. The method of claim 2, further comprising:
determining a current batch designation of the first cryptographic resource;
comparing the current batch designation of the first cryptographic resource to the first originating batch designation; and
in response to determining that the current batch designation corresponds to the first originating batch designation, determining to execute the first blockchain operation.

4. The method of claim 3, wherein determining the current batch designation of the first cryptographic resource further comprises:
querying a first blockchain node of a first blockchain network for the current batch designation; and
receiving the current batch designation from the first blockchain node.

5. The method of claim 3, further comprising:
receiving a second request to perform a second blockchain operation for a second cryptographic resource;
determining a current batch designation of the second cryptographic resource;
determining a second originating batch designation for the second blockchain operation;
comparing the current batch designation of the second cryptographic resource to the second originating batch designation; and
in response to determining that the current batch designation of the second cryptographic resource does not correspond to the second originating batch designation, determining not to execute the second blockchain operation.

6. The method of claim 5, further comprising:
in response to determining that the current batch designation of the second cryptographic resource does not correspond to the second originating batch designation, generating a second query, wherein the second query includes a third batch designation; and
generating a second function for the second blockchain operation using the third batch designation.

7. The method of claim 2, further comprising:
determining a first blockchain protocol for the first blockchain operation; and
determining a plurality of batch designations for the first blockchain protocol.

8. The method of claim 7, further comprising:
in response to receiving the first user input providing the first batch designation;

comparing the first batch designation to the plurality of batch designations; and
in response to determining that the first batch designation matches at least one batch designation of the plurality of batch designations, determining to generate the first function.

9. The method of claim 7, further comprising:
in response to receiving the second user input, providing the second batch designation;
comparing the second batch designation to the plurality of batch designations; and
in response to determining that the second batch designation matches at least one batch designation of the plurality of batch designations, determining to generate the first function.

10. The method of claim 7, further comprising:
in response to receiving the second user input, providing the second batch designation;
comparing the second batch designation to the plurality of batch designations; and
in response to determining that the second batch designation does not match at least one batch designation of the plurality of batch designations, generating a user query to create a new batch designation.

11. The method of claim 2, wherein the first query further comprises a first originating address and a first receiving address, wherein the first originating address identifies a first cryptographic storage application from which to transfer the first cryptographic resource from, wherein the first receiving address identifies a second cryptographic storage application to transfer the first cryptographic resource to, and wherein the first originating address and the first receiving address are compatible with a plurality of blockchain protocols, and wherein the first batch designation and the second batch designation are compatible with only a first blockchain protocol.

12. The method of claim 2, wherein generating the first query comprises querying a user for attributes of a function for performing the first blockchain operation, and wherein the attributes are specific to a blockchain standard.

13. The method of claim 2, wherein executing the first blockchain operation causes an on-chain record for the first cryptographic resource to re-batch the first cryptographic resource into a batch of on-chain records corresponding to the first receiving batch designation.

14. A non-transitory, computer-readable medium, comprising instructions that, when executed by one or more processors, cause operations comprising:
receiving a first request to perform a first blockchain operation for a first cryptographic resource;
in response to the first request, generating a first query for a first batch designation and a second batch designation, wherein the first batch designation comprises a first originating batch designation, and wherein the second batch designation comprises a first receiving batch designation;
receiving a first user input providing the first batch designation;
receiving a second user input providing the second batch designation;
in response to receiving both the first user input and the second user input, generating a first function for the first blockchain operation;
executing the first blockchain operation;
receiving a second request to perform a second blockchain operation for a second cryptographic resource;

determining a current batch designation of the second cryptographic resource;

determining a second originating batch designation for the second blockchain operation;

comparing the current batch designation of the second cryptographic resource to the second originating batch designation; and in response to determining that the current batch designation of the second cryptographic resource does not correspond to the second originating batch designation, determining not to execute the second blockchain operation.

15. The non-transitory, computer-readable medium of claim 14, wherein the instructions further cause operations comprising:

determining a current batch designation of the first cryptographic resource;

comparing the current batch designation of the first cryptographic resource to the first originating batch designation; and in response to determining that the current batch designation corresponds to the first originating batch designation, determining to execute the first blockchain operation.

16. The non-transitory, computer-readable medium of claim 15, wherein determining the current batch designation of the first cryptographic resource further comprises:

querying a first blockchain node of a first blockchain network for the current batch designation; and receiving the current batch designation from the first blockchain node.

17. The non-transitory, computer-readable medium of claim 14, wherein the instructions further cause operations comprising:

in response to determining that the current batch designation of the second cryptographic resource does not correspond to the second originating batch designation, generating a second query, wherein the second query includes a third batch designation; and generating a second function for the second blockchain operation using the third batch designation.

18. The non-transitory, computer-readable medium of claim 14, wherein generating the first query comprises querying a user for attributes of a function for performing the first blockchain operation, wherein the attributes are specific to a blockchain standard, wherein executing the first blockchain operation causes an on-chain record for the first cryptographic resource to re-batch the first cryptographic resource into a batch of on-chain records corresponding to the first receiving batch designation.

19. The non-transitory, computer-readable medium of claim 14, wherein generating the first query comprises querying a user for attributes of a function for performing the first blockchain operation, and wherein the attributes are specific to a blockchain standard.

20. The non-transitory, computer-readable medium of claim 14, wherein executing the first blockchain operation causes an on-chain record for the first cryptographic resource to re-batch the first cryptographic resource into a batch of on-chain records corresponding to the first receiving batch designation.

* * * * *